United States Patent [19]

Hishinuma

[11] Patent Number: 5,045,740
[45] Date of Patent: Sep. 3, 1991

[54] BRUSHLESS MOTOR

[75] Inventor: Nitaro Hishinuma, Sukagawa, Japan

[73] Assignee: Yamamoto Electric Corporation, Sukagawa, Japan

[21] Appl. No.: 498,232

[22] Filed: Mar. 23, 1990

Related U.S. Application Data

[63] Continuation-in-part of Ser. No. 245,362, Sep. 16, 1988, abandoned, and a continuation-in-part of Ser. No. 245,363, Sep. 16, 1988, abandoned.

[51] Int. Cl.$^5$ .............................................. H02K 21/12
[52] U.S. Cl. .................................. 310/156; 310/68 R; 310/68 B; 310/91; 310/194; 310/208; 310/254; 310/DIG. 6
[58] Field of Search ............... 310/156, DIG. 6, 68 B, 310/194, 89, 268, 91, 179, 208, 68 R, 254, 58, 62

[56] References Cited

U.S. PATENT DOCUMENTS

| | | | |
|---|---|---|---|
| 3,831,071 | 8/1974 | Mitsui | 310/156 UX |
| 3,867,656 | 2/1975 | Mitsui | 310/68 R |
| 4,553,075 | 11/1985 | Brown et al. | 310/68 R |
| 4,724,350 | 2/1988 | Shiraki et al. | 310/268 |
| 4,728,833 | 3/1988 | Shiraki et al. | 310/68 R |
| 4,733,119 | 3/1988 | Shiraki et al. | 310/268 |

FOREIGN PATENT DOCUMENTS 64-81633 3/1989 Japan .
64-81651 3/1989 Japan .

Primary Examiner—R. Skudy
Attorney, Agent, or Firm—Armstrong, Nikaido, Marmelstein, Kubovcik, & Murray

[57] ABSTRACT

A brushless motor comprising: a rotor constituted by a permanent magnet having a plurality of circumferentially alternately equally magnetized N and S magnetic poles; a stator having a plurality of excitation coils equidistantly disposed around the rotor; a rotor position detecting member such as a magneto-sensitive element; and a printed circuit board having a commutation circuit for switching the electric current for the excitation coils based on a detection signal of the rotor position detecting member; wherein the number of the magnetic poles of the rotor is selected so that the number of the magnetic poles of the rotor located within an area between respective center lines of two adjacent excitation coils is an odd number not smaller than three. The width of each excitation coil is selected so that an angle $\alpha$ formed between lines connecting the circumferential opposite ends of each excitation coil commonly to a center of the rotor is made equal to an angle $\beta$ formed between lines connecting the circumferential opposite ends of each magnetic pole of the rotor commonly to the center of the rotor.

7 Claims, 16 Drawing Sheets

BRUSHLESS MOTOR

This application is a continuation-in-part of co-pending U.S. patent application Ser. Nos. 245,362 and 245,363 filed Sept. 16, 1988, the contents of which are incorporated herein by reference, both now abandoned.

BACKGROUND OF THE INVENTION

The present invention relates to a brushless motor, more particularly relates to a brushless motor in which a rotor can be stopped at a predetermined position and the rotor can be restarted smoothly.

Generally, a brushless motor is provided with a rotor R constituted by a permanent magnet, a plurality of excitation coils C (driving coils) positioned in the circumference of the rotor R, a rotor position detecting member S such as a magnetosensitive element, and a commutation circuit for switching the electric current for the excitation coils C based on the detection signal of the rotor position detecting member S.

The position of the magnetic poles of the rotor R relative to the other stationary members varies as the rotor R rotates. Accordingly, if such an electric motor of this kind is once driven, it is impossible to stop the rotor R so that the magnetic poles come to desired positions relative to the excitation coils C.

In such a conventional electric motor of this kind, therefore, the rotor R may sometimes stop at a position where the magnetic poles of the rotor R directly face the respective excitation coils C, as shown in FIG. 9. In such a case, even if the motor is driven to restart, the motor may fall into a trough of torque in relation with the revolving angle of the rotor so that smooth restart can not be expected. This applies even the case where a rotor position detecting member S such as a magnetosensitive element or a magnetic-pole saturation element is provided in order to properly excite the excitation coils C. Further, when the rotor R is in such a stoppage position as shown in FIG. 9, the magnetic-pole detecting element cannot operate satisfactorily or operates erroneously to make the rotor rotate reversely.

In order to solve such a problem in the prior art, therefore, the same applicant as that of this application has proposed a brushless motor in which the rotor can be stopped at a predetermined position relative to the excitation coils whenever it is stopped, namely at a position where no dead point is caused in starting operation, and in which a rotor position detecting member is able to operate properly, in U.S. patent application Ser. Nos. 245,3362 and 245,363 corresponding to Japanese Patent Unexamined Publication Nos. 64-81633 and 64-81651.

In order to attain the above object, the brushless motor disclosed in the above Japanese Patent Unexamined Publication No. 64-81651 has the following features. That is, in a brushless motor comprising a rotor constituted by a permanent magnet having a plurality of circumferentially equally magnetized magnetic poles, a plurality of excitation coils equidistantly disposed around the rotor, a rotor position detecting member such as a magneto-sensitive element, and a commutation circuit for switching the electric current for the excitation coils based on the detection signal of the rotor position detecting member, the number of the magnetic poles of the rotor is selected so that the number of the magnetic poles of the rotor located in an area between the respective center lines of two adjacent excitation coils is an odd number not smaller than three and the width of each excitation coil is selected so that an angle $\alpha$ formed between lines connecting the circumferential opposite ends of each excitation coil to a center of the rotor is made equal to an angle $\beta$ formed between lines connecting the circumferential opposite ends of each magnetic pole of the rotor to the center of the rotor.

SUMMARY OF THE INVENTION

In the above brushless motor, however, the casing for housing the motor body (the stator, the rotor, etc.) is constituted by a rear chassis and a front cover, and three kinds of plate-like members, that is, a plate-like spacer of synthetic resin or the like, a printed circuit board having circuit patterns such as a commutation circuit etc. formed thereon, and a plate-like stator holding a field core, are laminated, in addition to the rotor, between the rear chassis and the front cover. Accordingly, the brushless motor is large in thickness and complicated in configuration.

It is therefore an object of the present invention to solve such a problem in the conventional technique and to provide a small-sized inexpensive brushless motor having a simple configuration, in which the rotor can be stopped at a predetermined position relative to the excitation coils whenever it is stopped, namely at a position where no dead point is caused in starting operation, and in which a rotor position detecting member is able to operate properly.

In order to attain the above object, according to the present invention, the brushless motor comprises: a rotor constituted by a permanent magnet having a plurality of circumferentially alternately equally magnetized N and S magnetic poles; a stator having a plurality of excitation coils equidistantly disposed around the rotor; a rotor position detecting member such as a magneto-sensitive element; and a printed circuit board having a commutation circuit for switching the electric current for the excitation coils based on a detection signal of the rotor position detecting member; wherein the number of the magnetic poles of the rotor is selected so that the number of the magnetic poles of the rotor located within an area between respective center lines of two adjacent excitation coils is an odd number not smaller than three; wherein the width of each excitation coil is selected so that an angle $\alpha$ formed between lines connecting the circumferential opposite ends of each excitation coil commonly to a center of the rotor is made equal to an angle $\beta$ formed between lines connecting ,the circumferential opposite ends of each magnetic pole of the rotor commonly to the center of the rotor; wherein the stator includes a plurality of bobbin members on which the plurality of excitation coils are wound correspondingly respectively, and a plate-like field core made of a magnetic material and having an opening for housing the rotor therein and having a plurality of supports for respectively holding the plurality of bobbin members, the supports being disposed along the inner circumference of the opening at positions in opposition to each other through the opening; and wherein the stator and the rotor are housed within a casing having an opening for passing wind generated by rotation of the rotor.

Preferably, the rotor position detecting member is provided on the inner circumference of the opening of the stator at a position in the vicinity of a center of two adjacent excitation coils.

Preferably, the stator includes holder means for holding the printed circuit board.

Preferably, the number of the excitation coils is two, the number of the magnetic poles is six, each of the angles α and β is 60 degrees, and the number of the plurality of supports is two.

In the brushless motor having such a configuration as described above, the same effect as that in the above-mentioned prior art brushless motor can be obtained with the reduced number of magnetic poles and the reduced number of excitation coils and since the field core serves as magnetic paths for magnetism caused by the excitation coils, the configuration of the stator can be made simple. Further, since the spacer required in the conventional brushless motor becomes unnecessary and since the printed circuit board is integrally supported by the stator, it is possible to make the thickness of the motor thin. Further, in the case where the casing is constituted by a side surface portion, a front cover portion opposite to the rotating face of the rotor and a rear chassis portion, the stator may be used so as to serve also as the rear chassis portion to thereby make the motor thin in thickness and make the motor inexpensive.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Referring to the accompanying drawings, an embodiment of the present invention will be explained in detail hereunder.

Figure 2:
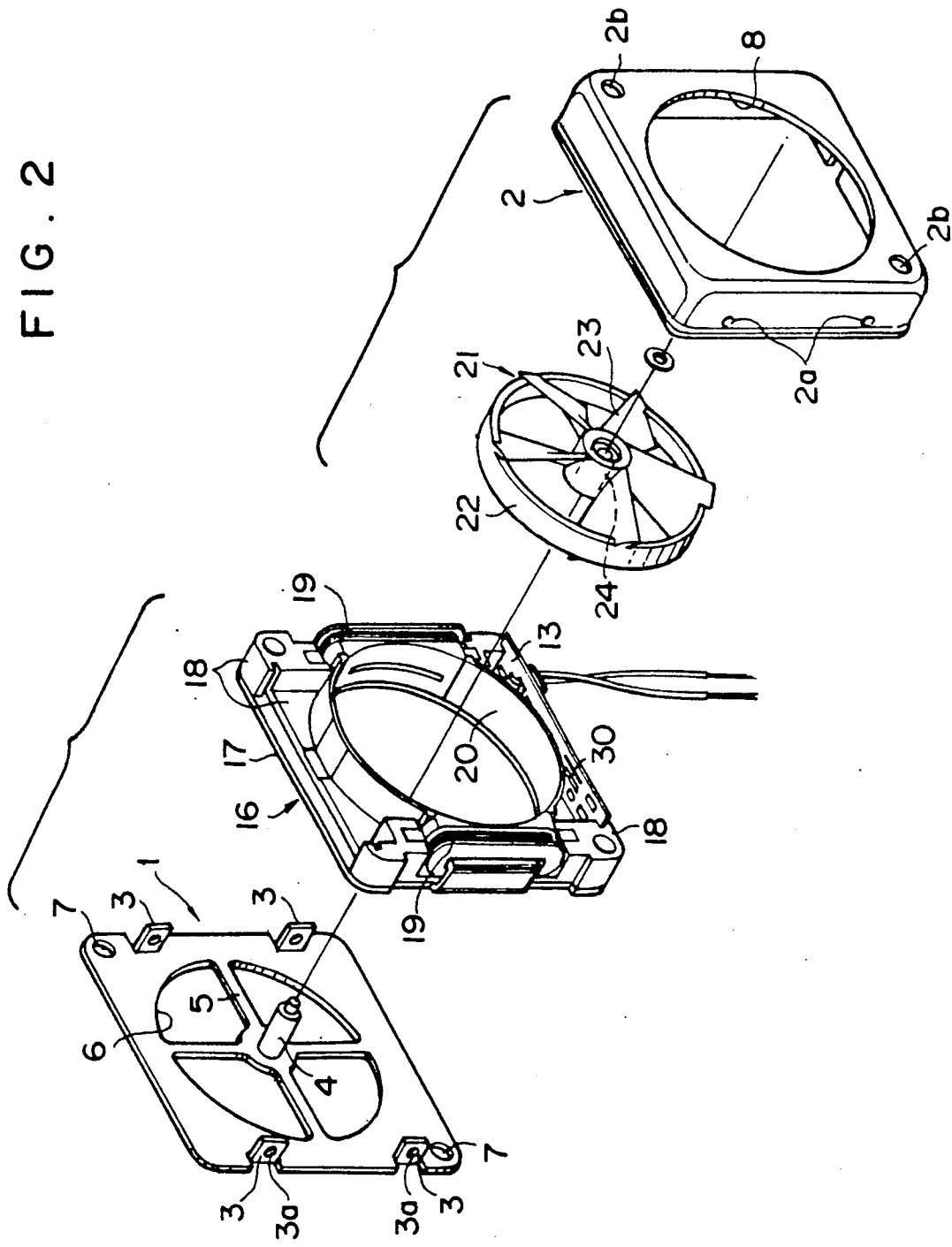
FIG. 2 is an exploded perspective view of the brushless motor.

FIG. 2 is an exploded perspective view of a driving motor, as an embodiment of the brushless motor according to the present invention, for a cooling fan of an automobile audio equipment.

In the drawing, a rear chassis 1 and a front cover 2 constitute a casing for housing a body portion of the motor.

The rear chassis 1 has engagement latches 3 which are bent at right angles at upper and lower positions on each of the opposite sides thereof. A bearing 4 is provided at the center of the rear chassis 1 and vent openings 6 are formed through the sheet of the rear chassis 1 around the bearing 4 with a cross-shaped bridge portion 5 left thereat so as to support the bearing 4. Two through holes 7 for screws are formed at the surrounding of the vent openings 6.

A circular opening 8 is bored through a front plate of the front cover 2 at a position corresponding to the vent openings 6.

Through holes 3a for screws are formed in the respective engagement latches 3 and through holes 2a for screws are formed in the front cover 2 correspondingly to the through holes 3a so as to fixedly connect the rear chassis 1 and the front cover 2 with each other through screws.

Figure 3:
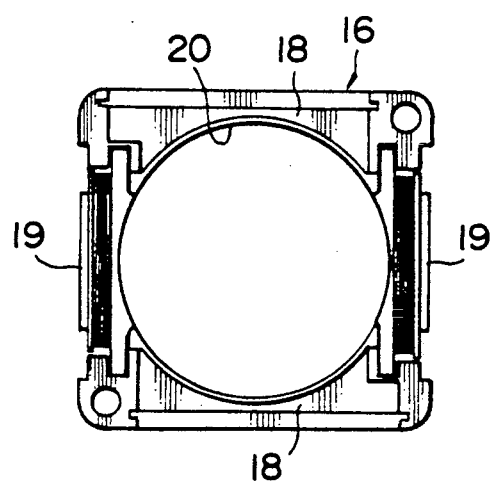
FIG. 3 is a front view of the stator of the brushless motor.
Figure 4:
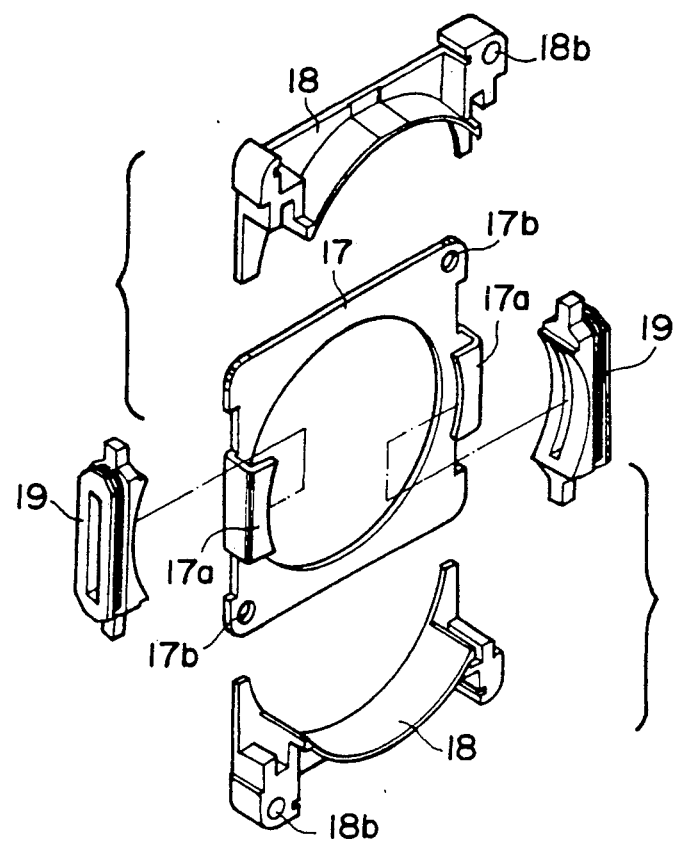
FIG. 4 is an exploded perspective view of the stator.

As seen in FIGS. 3 and 4, a stator 16 is constituted by a field core 17 made of a flat and substantially rectangular sheet of a magnetic material, a pair of core holders 18 for supporting the field core 17, and bobbins 19 on which coils are wound.

Figure 5A:
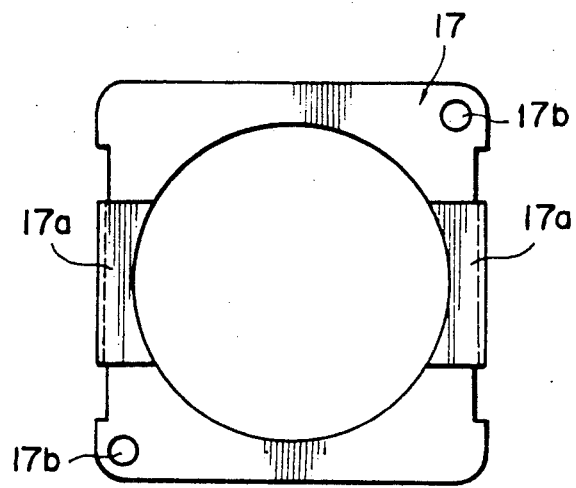
FIGS. 5A and 5B are front and side views of the field core of the brushless motor.
Figure 5B:

As illustrated more in detail in FIGS. 5A and 5B, the field core 17 has an outer peripheral shape of a substantially regular square and an inner peripheral shape of a circle so as to accord with the shape of the vent openings 6. A pair of supports 17a for supporting the bobbins 19 for constituting two-pole excitation coils C1 and C2 which will be described later more in detail are provided on the opposite sides of the outer peripheral regular square of the field core so as to project inward to be in opposition to each other through the opening of the field core 17. Further, through holes 17b for screws are formed in the field core 17 at positions corresponding to the through holes 7 of the rear chassis 1.

Figures 6A, 6B:
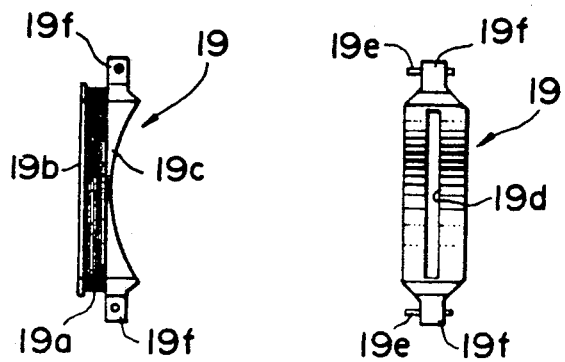
FIGS. 6A and 6B are front and plan views of the coil bobbin of the brushless motor.

Each bobbin 19 is integrally formed of an insulating material, and constituted, as shown in FIGS. 6A and 6B, by a body 19a on which an excitation coil is wound, a base 19b which abuts on the inner circumference of the field core 17, and an arc-shaped top 19c having a concave periphery of a predetermined curvature. A flat slot 19d is formed through the bobbin at the widthwise center thereof from the base 19b to the top 19c through the body 19a, and the corresponding support 17a of the field core 17 is fixedly inserted into the slot 19d. Pins 19e are provided so as to project from the respective lower portions at the opposite ends of the arc-shaped top 19c, so that the terminals of the coil wound on the body 19a are connected to the respective pins 19e which are in turn connected to a circuit pattern of a printed circuit board 13 through lead wires.

Figures 7A, 7B, 7C:
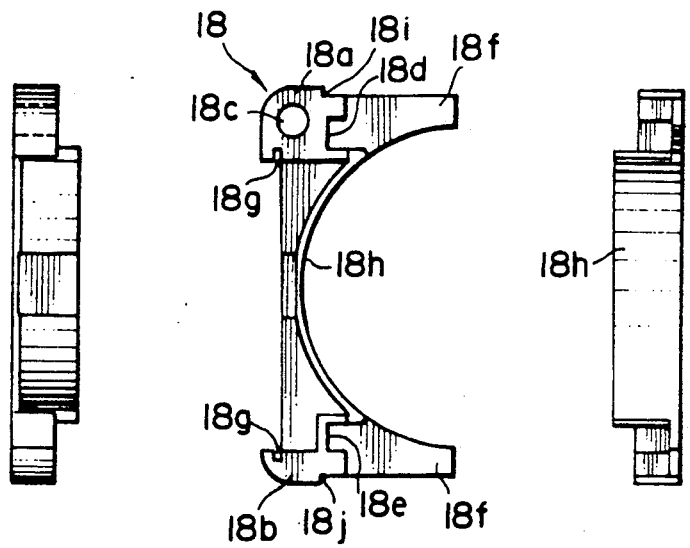
FIGS. 7A, 7B and 7C are front, left side, and right side views of the core holder of the stator.
Figure 8:
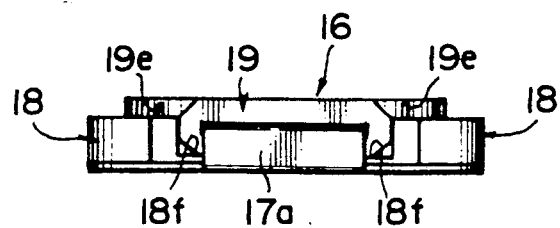
FIG. 8 is a side view of the stator.
Figure 9:
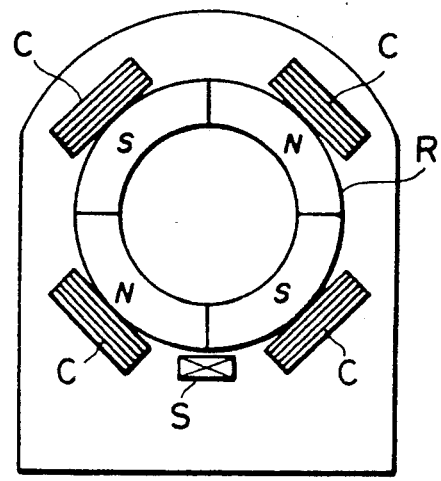
FIG. 9 is a schematic view of the conventional brushless motor for pointing out the problem therein.

As shown more in detail in FIGS. 7A, 7B and 7C, the core holders 18 are formed of a non-magnetic material so that the size and shape are the same in the whole as those of the field core 17. Upright holder portions 18a and 18b are formed respectively at the opposite ends of each of the core holders 18. A through hole 18c for a screw is formed in the holder portion 18a at a position corresponding to the through hole 7. The respective holder portions 18a and 18b have recess portions 18d and 18e into which the respective ends 19f of the bobbin 19 are fitted to thereby hold the bobbin 19 thereat when the core holders 18 are fitted to the field core 17 having bobbins 19 attached thereon. The respective holder portions 18a and 18b further have grooves 18g to which an end of the printed circuit board 13 is inserted to thereby be held thereat. FIG. 2 shows the state in which the printed circuit board 13 is inserted so as to be held in the grooves 18g. The printed circuit board 13 has circuit patterns such a known commutation circuit, etc. formed thereon. End portions 18f of each core holder 18 are inserted into a space between the corresponding bobbin 19 and the core field 17 on which the bobbins 19 have been attached, so that the end portions 18f are fixedly held thereat (see FIG. 8). The respective holder portions 18a and 18b further have recess portions 18i and 18j to thereby make the engagement latches 3 of the rear chassis 1 are fitted in the recess portions 18i and 18j, to thereby make the rear chassis 1 hold the field core 17 when the rear chassis 1 is fitted to the assembled field core 17 (see FIGS. 2 and 3).

The respective core holders 18 have inner peripheral walls 18h each having a concave curvature the same as that of the arc-shaped tops 19c of the bobbins 19 so that the inner peripheries of the respective core holders 18 continues to the inner peripheries of the respective arc-shaped tops 19c so as to make up a cylindrical wind tunnel 20 inside the field core 17 when the core holders 18 are fitted to the field core 17 on which the bobbins 19 have been attached (see FIGS. 2 and 3).

A color 21 is arranged to rotate within the field core 17 of the above mentioned stator 16. The rotor 21 is constituted by a rotor body 22 made of a permanent magnet, a blade member 23 provided in the inner circumference of the rotor body 22, and a rotary shaft 24 provided at the center of the blade member 23.

Figure 1:
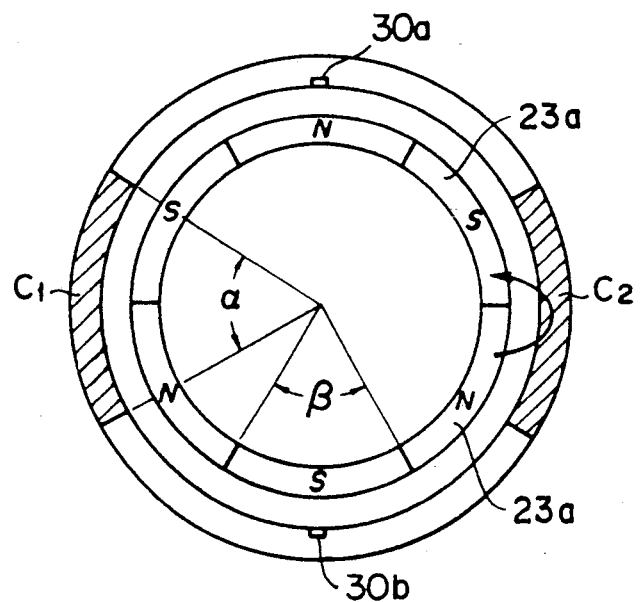
FIG. 1 is a diagram showing the structure of the excitation coils and the magnetic rotor of an embodiment of the brushless motor according to the present invention.

As shown in FIG. 1, the rotor body 22 has six equally magnetized magnetic poles 23a so that three magnetic poles are located in each area defined by the respective center lines of the excitation coils C1 and C2, that is, for example, N, S and N magnetic poles are located in the lower area defined by the center lines, while S, N and S magnetic poles are located in the upper area defined by the same center lines in the drawing. The excitation coils C1 and C2 and the magnetic poles 23a of the rotor body 22 are so arranged that the central angle $\beta$ formed by two radial lines emanating from the circumferentially opposite ends of each magnetic pole 23a converge at the center of the rotor body 22 is equal to the central angle $\alpha$ formed by two radial lines emanating from the circumferentially opposite ends of each excitation coil to converge at the center of the rotor body 22. In this embodiment, each of the central angles of $\alpha$ and $\beta$ is 60 degrees. The rotary shaft 24 of the rotor 21 is rotatably supported by the bearing 4 of the rear chassis 1.

The brushless motor assembled with the positional relationship shown in the exploded perspective view of FIG. 2 has a magnetic pole detecting element, such as a Hall element, provided at a predetermined position, so that the magnetic pole detecting element detects the magnetic pole 23a of the rotor body 22 and transmits a signal to a predetermined one of the excitation coils C1 and C2 to excite the coil to either N or S pole to thereby rotate the rotor 21.

When the power source is turned off, the rotor 21 decelerates gradually to stop with a positional relationship as shown in FIG. 1, that is, at a position where the circumferential center of each of the excitation coils C1 and C2 and the boundary of adjacent two magnetic poles of the rotor body 22 are exactly in opposition to each other. The stoppage at such a position is made possible because the magnetic poles of the rotor body 22 form a magnetic path for the field core (iron core) 17 of each coil immediately before the rotor 21 comes to stop, as indicated by an arrow with respective to the coil C2 in FIG. 1.

As a result, it becomes possible to prejudge where the boundary of magnetic poles of the rotor body 22 will be when the rotor 21 has stopped completely, and therefore the magnetic pole detecting element may be positioned at a position other that the locations of the boundaries.

As described above, since three magnetic poles of the rotor 21 are located within each area formed between the center lines of the two adjacent excitation coils C1 and C2, the magnetic poles facing one excitation coil C1 are in reverse in polarity to the magnetic poles facing the other excitation coil C2 so that the rotor 21 is ensured to start rotation in response to the signal transmitted successively to the excitation coils C1 and C2.

The wind generated by the rotation of the rotor 21 smoothly and noiselessly passes through the cylindrical wind tunnel 20 of a predetermined curvature which is constituted by the respective inner peripheries of the arc-shaped tops 19c of the bobbins 19 and the inner peripheral walls 18h of the core holders 18 so as to circularly enclose the outer periphery of the rotor 21.

Preferably, the magnetic pole detecting element is provided at a position 30a or 30b in the vicinity of a circumferentially central portion between adjacent excitation coils of the stator as shown in FIG. 1. Actually, the magnetic pole detecting element is provided at a position 30 on the printed circuit board 13 as shown in FIG. 2.

In the above embodiment, the same effects as that in the above-mentioned prior art brushless motor can be obtained with the reduced number of magnetic poles and the reduced number of excitation coils, and since the field core serves as magnetic paths for magnetism caused by the excitation coils, the configuration of the stator can be made simple. Further, since the spacer required in the conventional brushless motor becomes unnecessary and since the printed circuit board is integrally supported by the stator, it is possible to make the thickness of the motor thin and to reduce the size as well as the cost of the motor.

Figure 10A:
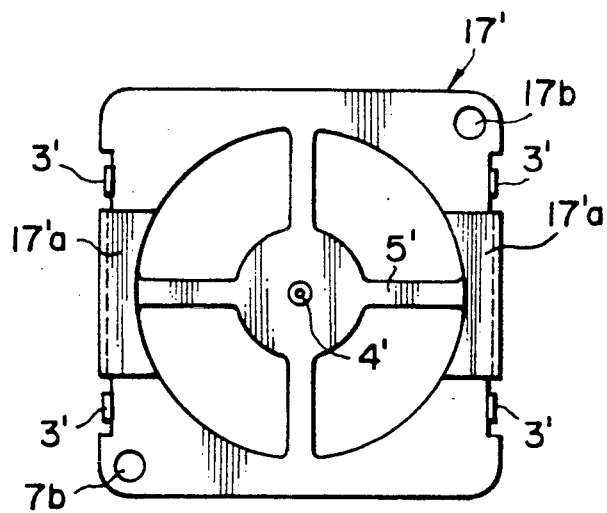
FIGS. 10A and 10B are front and side views showing a modification of the rear chassis and the field
Figure 10B:
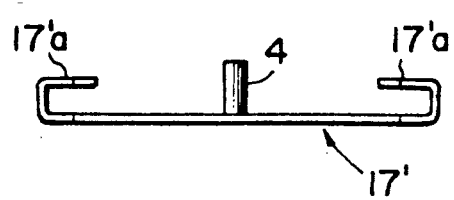

As shown in FIGS. 10A and 10B, if the field core 17 is made to serve as the rear chassis 1, it is possible to make the thickness of the motor thinner and to make the motor more inexpensive. That is, as shown in FIGS. 10A and 10B, the bridge portion, the bearing and the engagement latches of the rear chassis are provided in the field core 17 of FIGS. 5A and 5B so as to form a field core 17' provided with a bridge portion 5', a bearing 4' and engagement latches 3' so that the rear chassis 1 is omitted in this modification.

Figure 11A:
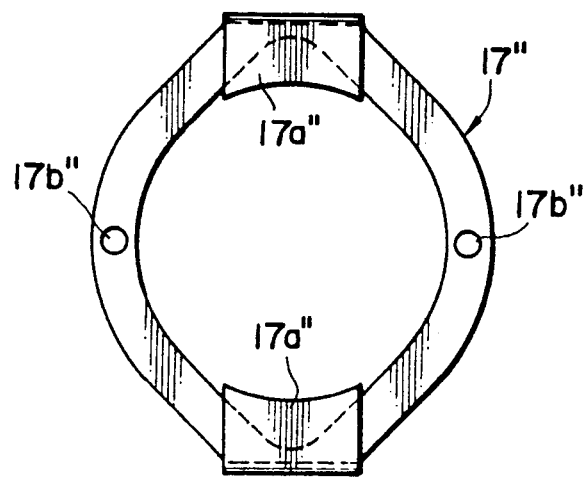
FIGS. 11A and 11B are front and side views showing another modification of the field core.
Figure 11B:
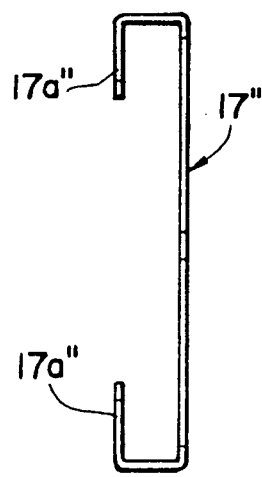

Further, the field core 17 of the stator may be modified so as to have such a shape as shown in FIGS. 11A and 11B. Of course, the rear chassis 1 and front cover 2 are made to have the same shape as that of the field core 17. In FIGS. 11A and 11B, the reference numerals 17'', 17a'', and 17b'' designate the field core, the supports, and the holes for screws respectively.

Figure 12A:
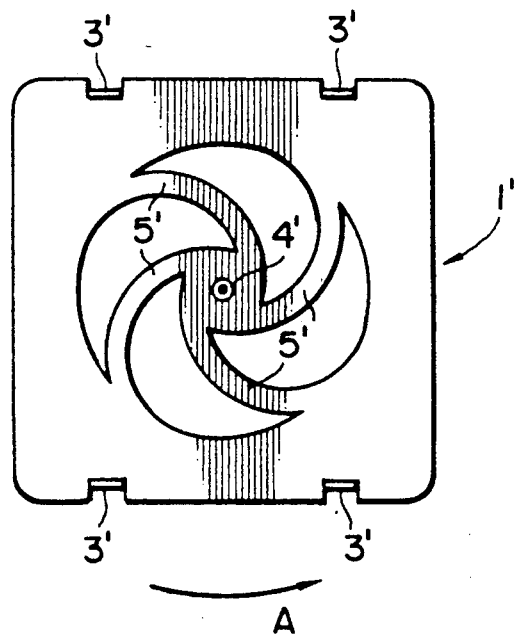
FIGS. 12A and 12B are front and side views showing another modification of the rear chassis.
Figure 12B:
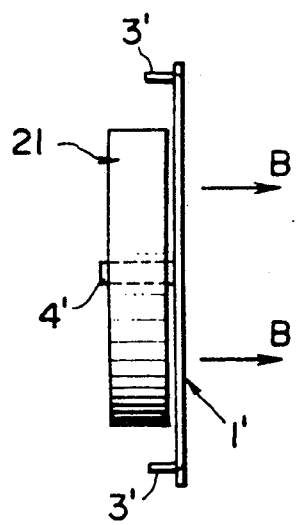

Further, in order to reduce noise during rotation of the blade member or fan, the bridge portion of the rear chassis 1 may be modified so as to have such a shape as shown in FIGS. 12A and 12B. In the drawings, reference numerals 1', 3', 4' and 5' designate the rear chassis, the engagement latches, the bearing, and the bridge portion respectively. The arrow B indicates the direction of wind when the rotor 21 mounted on the bearing 4' is driven to rotate in the direction of the arrow A.

Although the number of the excitation coils of the stator is selected to be two and the number of the magnetic poles of the rotor is selected to six in the above embodiments, the present invention is not limited to this, but is applicable to the case where, as in the same manner as the above-mentioned Japanese Patent Unexamined Publication No. 64-81651, the number of the excitation coils of the stator is selected to be four or more and the number of the magnetic poles of the rotor is selected so that the number of said magnetic poles located in an area between center lines of two adjacent excitation coils is an odd number not smaller than three, and that the width of each excitation coil is selected so as to make equal the angle $\alpha$ formed between lines connecting the circumferential opposite ends of each excitation coil to a center of said rotor to the angle $\beta$ formed between lines connecting the circumferential opposite ends of each magnetic pole of said rotor to said center of said rotor. In this case, the stator and the casing are made to be the same in shape and in structure as those in the above embodiments, and preferably, the outer shape of the stator and the casing is made to be a regular octagon (when the number of the excitation coils of the stator is selected to be four), or the like.

I claim:

1. A brushless motor comprising:
   a rotor constituted by a permanent magnet having a plurality of circumferentially alternately equally magnetized N and S magnetic poles;
   a stator having a plurality of excitation coils equidistantly disposed around said rotor;
   a rotor position detecting member such as a magneto-sensitive element; and
   a printed circuit board having a commutation circuit for switching the electric current, for said excitation coils based on a detection signal of said rotor position detecting member;
   wherein the number of said magnetic poles of said rotor is selected so that the number of said magnetic poles of said rotor located within an area between respective center lines of two adjacent excitation coils is an odd number not smaller than three;
   wherein the width of each excitation coil is selected so that an angle $\alpha$ formed between lines connecting the circumferential opposite ends of each excitation coil commonly to a center of said rotor is made equal to an angle $\beta$ formed between lines connecting the circumferential opposite ends of each magnetic pole of said rotor commonly to said center of said rotor;
   wherein said stator includes a plurality of bobbin members on which said plurality of excitation coils are wound correspondingly respectively, and a plate-like field core made of a magnetic material and having an opening for housing said rotor therein and having a plurality of supports for respectively holding said plurality of bobbin members, said supports being disposed along the inner circumference of said opening at positions in opposition to each other through said opening; and
   wherein said stator and said rotor are housed within a casing having an opening for passing wind generated by rotation of said rotor.

2. A brushless motor according to claim 1, wherein said rotor position detecting member is provided on the inner circumference of said opening of said stator at a position in the vicinity of a center of two adjacent excitation coils.

3. A brushless motor according to claim 1, wherein said stator includes holder means for holding said printed circuit board.

4. A brushless motor according to claim 1, wherein said field core of said stator forms a face of said casing.

5. A brushless motor according to claim 3, wherein said holder means includes said plurality of supports for respectively holding said plurality of bobbin members.

6. A brushless motor according to claim 1, wherein the number of said excitation coils is two, the number of said magnetic poles is six, each of said angles $\alpha$ and $\beta$ is 60 degrees, and the number of said plurality of supports is two.

7. A brushless motor according to claim 3, wherein side surfaces at a side of said bobbin adjacent said opening and said holding means defines a path for passing wind in cooperation with the inner circumference of said opening.

* * * * *